(12) United States Patent
Axnäs et al.

(10) Patent No.: US 11,044,032 B2
(45) Date of Patent: Jun. 22, 2021

(54) SEQUENCE GENERATION

(71) Applicant: Telefonaktiebolaget LM Ericsson (publ), Stockholm (SE)

(72) Inventors: Johan Axnäs, Solna (SE); Robert Baldemair, Solna (SE); Naga Vishnu Kanth Irukulapati, Gothenburg (SE); Andres Reial, Malmö (SE); Henrik Sahlin, Mölnlycke (SE); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/490,782

(22) PCT Filed: Nov. 20, 2017

(86) PCT No.: PCT/SE2017/051150
§ 371 (c)(1),
(2) Date: Sep. 3, 2019

(87) PCT Pub. No.: WO2018/160110
PCT Pub. Date: Sep. 7, 2018

(65) Prior Publication Data
US 2020/0007260 A1 Jan. 2, 2020

Related U.S. Application Data

(60) Provisional application No. 62/466,650, filed on Mar. 3, 2017.

(51) Int. Cl.
H04J 13/10 (2011.01)
H04J 13/00 (2011.01)
H04W 74/00 (2009.01)

(52) U.S. Cl.
CPC ........ *H04J 13/102* (2013.01); *H04J 13/0029* (2013.01); *H04J 13/0062* (2013.01); *H04W 74/008* (2013.01)

(58) Field of Classification Search
CPC .............. H04W 74/008; H04J 13/0029; H04J 13/0062; H04J 13/10; H04J 13/102
See application file for complete search history.

(56) References Cited

U.S. PATENT DOCUMENTS

2007/0230600 A1    10/2007  Bertrand et al.
2009/0046629 A1*    2/2009  Jiang ................... H04J 13/0062
                                                            370/328

(Continued)

FOREIGN PATENT DOCUMENTS

CN    102036408 A    4/2011
CN    102884771 A    1/2013

(Continued)

OTHER PUBLICATIONS

Md Mashud Hyder and Kaushik Mahata, "Zadoff-Chu Sequence Design for Random Access Initial Uplink Synchronization", Apr. 6, 2016 (Year: 2016).*

(Continued)

*Primary Examiner* — Khanh C Tran
(74) *Attorney, Agent, or Firm* — Murphy, Bilak & Homiller, PLLC

(57) ABSTRACT

A controller generates a sequence by one of (a) splitting a base sequence into multiple equal-size segments and adding said segments elementwise, and (b) generating several cyclically shifted versions of a base sequence, adding the cyclically shifted versions together, and truncating said cyclically shifted versions.

15 Claims, 6 Drawing Sheets

(56) References Cited

U.S. PATENT DOCUMENTS

| | | | | |
|---|---|---|---|---|
| 2010/0074130 A1* | 3/2010 | Bertrand | ............ | H04W 74/008 370/252 |
| 2010/0195637 A1* | 8/2010 | Iwai | ............ | H04J 13/105 370/343 |
| 2010/0195700 A1* | 8/2010 | Ogawa | ............ | H04L 25/0258 375/132 |
| 2011/0280181 A1* | 11/2011 | Guey | ............ | H04L 27/2607 370/328 |
| 2014/0177427 A1* | 6/2014 | Yiu | ............ | H04W 24/02 370/208 |
| 2014/0226591 A1* | 8/2014 | Han | ............ | H04J 13/16 370/329 |
| 2018/0331775 A1* | 11/2018 | Lin | ............ | H04L 27/2613 |
| 2020/0007260 A1 | 1/2020 | Axnäs et al. | | |
| 2020/0068617 A1* | 2/2020 | Yoon | ............ | H04J 13/0062 |

FOREIGN PATENT DOCUMENTS

| | | |
|---|---|---|
| WO | 2015144208 A1 | 10/2015 |
| WO | 2015144256 A1 | 10/2015 |
| WO | 2018160110 A1 | 9/2018 |

OTHER PUBLICATIONS

Yun-He Cao, IRCI-Free MIMO-OFDM SAR Using Circularly Shifted Zadoff-Chu Sequences, May 2015, IEEE Geoscience and Remote Sensing Letters, vol. 12, No. 5, pp. 1126-1130. (Year: 2015).*

Sarwate, Dilip V, "Bounds on Crosscorrelation and Autocorrelation of Sequences", IEEE Transactions on Information Theory, vol. IT-25, No. 6, Nov. 1979, pp. 720-724.

Unknown, Author, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, pp. 1-83.

Unknown, Author, "RACH preamble design for NR", 3GPP TSG RAN WG1 NR Ad Hoc Meeting, R1-1700034, Spokane, USA, Jan. 16-20, 2017, pp. 1-12.

Unknown, Author, "Uplink Control Channel Design for Shortened TTI", 3GPP TSG RAN WG1 #87, R1-1611639, Reno, USA, Nov. 14-18, 2016, pp. 1-9.

* cited by examiner

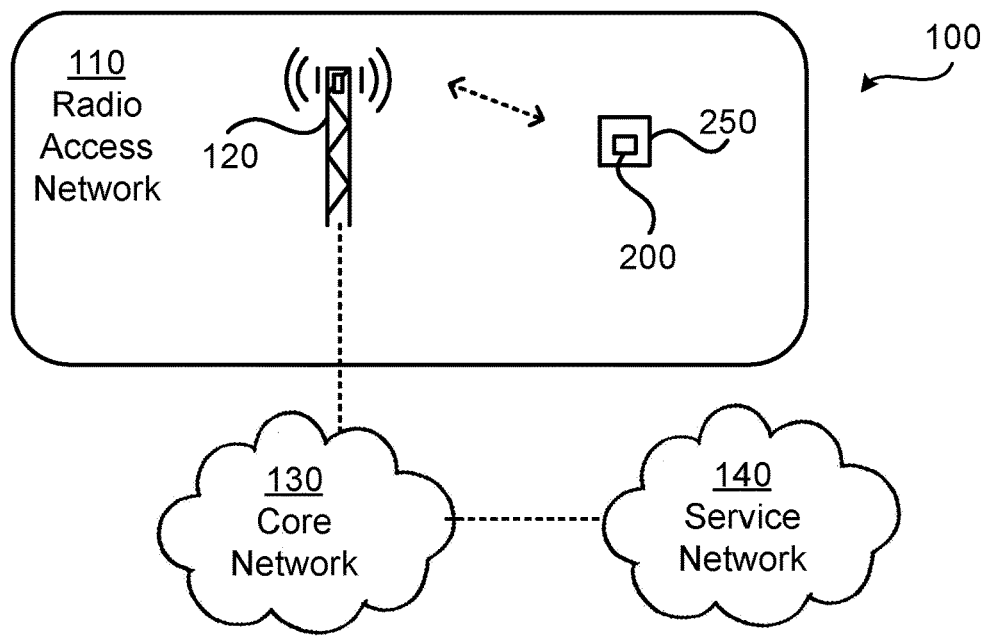
Fig. 1
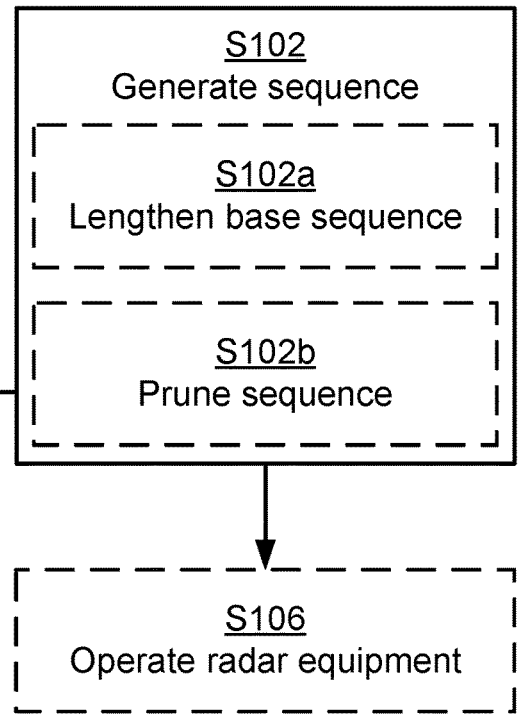
Fig. 2
Fig. 3

SEQUENCE GENERATION

TECHNICAL FIELD

Embodiments presented herein relate to a method, a controller, a computer program, and a computer program product for generating a sequence.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is sequences with good correlation properties.

Let $S=\{s_u\}_{u=0}^{M-1}$ be a set of M complex-valued sequences:

$$s_u(i), i=0,1,\ldots,L-1 \quad (1)$$

Unless otherwise stated, it will be assumed that the sequences are normalized such that $$\frac{1}{L}\sum_{i=0}^{L-1}|s_u(i)|^2 = 1 \quad (2)$$

The circular correlation between two sequences $s_u$ and $s_v$ is defined as $$\theta_{u,v}(\tau)=\sum_{i=0}^{L-1}s_u^*(i)s_v((i+\tau)\bmod L) \quad (2)$$

where $\tau$ is the time lag (time offset) between the two sequences being correlated, and (i+τ) mod L denotes addition modulo L. The circular correlation may also be referred to as the cyclic or periodic correlation. Alternatively, the sequence may be defined as a periodic sequence with period L. The modulo operation is then not necessary. This latter definition will not be used hereinafter, but all results presented herein can be translated to this alternative definition.

The circular correlation is the most relevant type of correlation in the context of PRACH preambles (see, below), or any other context where a signal is periodic or partially periodic, e.g. by having a cyclic prefix (CP). Another quantity is the linear, aperiodic, or non-periodic correlation, defined as $$C_{u,v}(\tau) = \begin{cases} \sum_{i=0}^{L-1-\tau} s_u^*(i)s_v(i+\tau), & 0 \leq \tau < L-1, \\ \sum_{i=0}^{L-1+\tau} s_u^*(i-\tau)s_v(i), & 1-L \leq \tau < 0, \\ 0, & |\tau| \geq L. \end{cases} \quad (3)$$

Hereinafter the circular correlation will for brevity be referred to as just correlation. It should however be noted that the methods presented hereinafter can be useful also in situations where the non-periodic correlation is the more relevant quantity to study, e.g. single-symbol detection like PSS.

A special case of the correlation is the autocorrelation, $\theta_{u,u}(\tau)$. The correlation $\theta_{u,v}(\tau)$ where u≠v is referred to as the crosscorrelation between $s_u$ and $s_v$. Auto- and crosscorrelation properties will often be collectively referred to as just correlation properties.

Define the maximum auto- and cross-correlation magnitudes as $$\theta_a=\max\{\theta_{u,u}(\tau)|: u \in S, 0<\tau\leq L-1\} \quad (4)$$

and $$\theta_c=\max\{\theta_{u,v}(\tau)|: u,v \in S, u\neq v, 0\leq\tau\leq L-1\}, \quad (5)$$

respectively. The parameter $\theta_a$ does not take into account the correlation for lag τ=0, which is L for any normalized sequence, and is usually referred to as the trivial correlation.

For every correlation quantity, $\theta_{u,v}(\tau), \theta_a$, etc., a corresponding normalized correlation quantity $\hat{\cdot}$ can be defined as $$\hat{\theta}_{u,v}(\tau)=\theta_{u,v}(\tau)/L, \hat{\theta}_a=\theta_a/L, \text{etc.} \quad (5)$$

Correlations are commonly assumed to be defined only for integer time lags τ. In this document correlations for non-integer time lags, more generally referred to as continuous time (and sometimes approximated by using oversampling) are also considered. Integer time lags will sometimes be referred to as discrete time.

For a given sequence length L, there are several different theoretical bounds on the number M of sequences that can be generated while maintaining certain correlation properties. For example, according to [Sarwate, "Bounds on crosscorrelation and autocorrelation of sequences", *IEEE Trans. Info. Theory*, 1979], it holds (for integer time lags) that $$\frac{L-1}{L(M-1)}\left(\frac{\theta_a}{L}\right)^2 + \left(\frac{\theta_c}{L}\right)^2 \geq 1 \quad (6)$$

This bound is asymptotically (for large M, L) tight for some sequences. For example, Zadoff-Chu sequences, which in case of prime-number length allow generation of a set of L−1 sequences with $\theta_a=0$ and $\hat{\theta}=1/\sqrt{L}$ (i.e., $\theta_c=\sqrt{L}$), are asymptotically tight on this bound according to Theorem 3 therein. Another bound, which may be tighter for K>L is according to the above document by Sarwate (again for integer time lag)

$$\frac{L^2-1}{L^2(2M-1-L)}\left(\frac{\theta_a^2}{L}\right)^2 + \frac{(M-1)(L+1)}{L(2M-1-L)}\left(\frac{\theta_c^2}{L}\right)^2 \geq 1$$

According to this bound, in order to increase the number of sequences M to the order of 2 L while maintaining $\theta_a \approx 0$, the value of $\theta_c$ must be allowed to increase by a factor of roughly $$\sqrt[4]{3/2} \approx 1.11$$

compared to Zadoff-Chu sequences. In other words, in order to increase the number of sequences substantially beyond L−1, the correlation properties must be allowed to degrade compared to Zadoff-Chu sequences.

Known sequence types either (i) can only be used to generate a limited number of sequences (e.g. Zadoff-Chu which for length L can be used to maximally generate L−1 different sequences) or (ii) can be used to generate a large number of sequences, but with substantially worse correlation properties than e.g. Zadoff-Chu sequences.

Hence, there is still a need for generating sequences that are comparatively short yet have good correlation properties.

SUMMARY

An object of embodiments herein is to provide efficient generation of sequences that are comparatively short yet have good correlation properties.

According to a first aspect there is presented a method for generating a sequence. The method is performed by controller. The method comprises generating the sequence by one of (a) splitting a base sequence into multiple equal-size segments and adding said segments elementwise, and (b) generating several cyclically shifted versions of a base sequence, adding the cyclically shifted versions together, and truncating said added cyclically shifted versions, and (b') generating several cyclically shifted long sequences, and truncating said cyclically shifted long sequences.

Advantageously this provides efficient generation of a sequence that is comparatively short yet has good correlation properties.

Advantageously this method can be used to improve network capacity and coverage (regarding synchronization, random access, handover, etc.).

Advantageously this method can be used to generate a much larger set of sequences than possible with, e.g., normal ZC sequences, while still achieving similar auto- and cross-correlation properties and comparable PAPR. This can improve miss-detection (or missed detection) and false-detection rates in situations with many nodes and/or much interference, and hence improve network capacity. This is possible because the method can use input base sequences that are longer than the output sequences. Indeed, for several known types of sequences, there exist more length-p sequences the greater p is; this was noted above for ZC sequences.

Advantageously this method can be used to generate a similar number of sequences as is possible with normal ZC, while improving PAPR. This can improve miss-detection and false-detection rates in particular in coverage-limited scenarios, and can hence improve network coverage According to a second aspect there is presented a controller for generating a sequence. The controller comprises processing circuitry. The processing circuitry is configured to cause the controller to generate the sequence by one of (a) splitting a base sequence into multiple equal-size segments and adding said segments elementwise, and (b) generating several cyclically shifted versions of a base sequence, adding the cyclically shifted versions together, and truncating said added cyclically shifted versions, and (b') generating several cyclically shifted long sequences, and truncating said cyclically shifted long sequences.

According to a third aspect there is presented a controller for generating a sequence. The controller comprises processing circuitry and a storage medium. The storage medium stores instructions that, when executed by the processing circuitry, cause the controller to generate the sequence by one of (a) splitting a base sequence into multiple equal-size segments and adding said segments elementwise, and (b) generating several cyclically shifted versions of a base sequence, adding the cyclically shifted versions together, and truncating said added cyclically shifted versions, and (b') generating several cyclically shifted long sequences, and truncating said cyclically shifted long sequences.

According to a fourth aspect there is presented a controller for generating a sequence. The controller comprises a generate module configured to generate the sequence by one of (a) splitting a base sequence into multiple equal-size segments and adding said segments elementwise, and (b) generating several cyclically shifted versions of a base sequence, adding the cyclically shifted versions together, and truncating said added cyclically shifted versions, and (b') generating several cyclically shifted long sequences, and truncating said cyclically shifted long sequences.

According to a fifth aspect there is presented a computer program for generating a sequence, the computer program comprising computer program code which, when run on a controller, causes the controller to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

According to a seventh aspect there is presented a method implemented in a radio transceiver device. The method comprises transmitting a sequence obtainable by the method of the first aspect as at least one of synchronization information and identification information.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims and items as well as from the drawings.

Generally, all terms used in the claims and enumerated embodiments are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, and 4 are flowcharts of methods according to embodiments;

DETAILED DESCRIPTION

Figure 4:
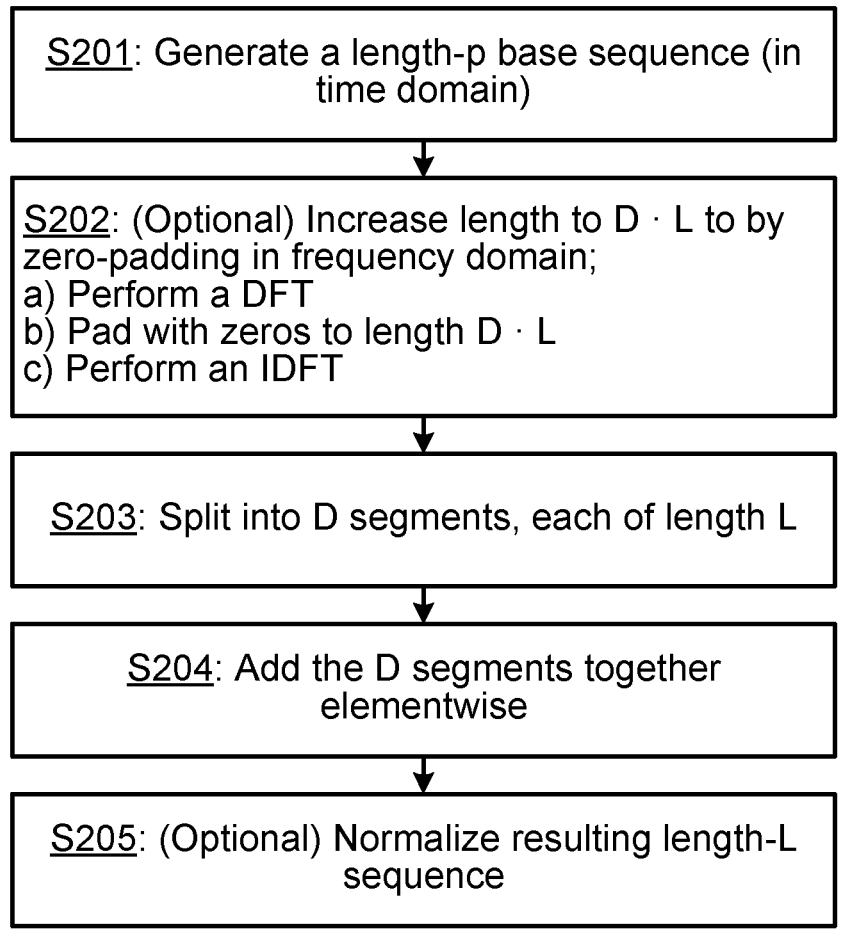

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic illustration of a communications network 100 where the herein disclosed embodiments apply. The communications network 100 comprises a radio access network 110 comprising at least one radio access network node 120, a core network 130 and a service network 140. The radio access network node 120 could implement the functionality of a transmission and reception point (TRP). The radio access network node 120 provides network access and connectivity to served radio transceiver devices 250. There could be different examples of radio transceiver devices. Examples, include, but are not limited, to user equipment (UE), mobile phones, tablet computers, wireless modems, network equipped vehicles, network equipped sensors, Internet of Things devices, etc. The radio transceiver device comprises a controller 200. As will be further disclosed the controller is configured to generate sequences. Such sequences could be used by the radio transceiver device for different purposes.

The communications network 100 is only one example where the controller 200 could be used. For example, as will be disclosed below, the controller 200 could be part of a radar equipment.

Sequences with good correlation properties are often used for detection of the presence of a signal and/or for synchronization in time and frequency (i.e. to determine frequency reference difference between transmitter and receiver), for example between the radio transceiver device 250 and the TRP 120 in FIG. 1. The receiver then usually evaluates a set of hypotheses for (i) which sequence was transmitted and (ii) what the time- and/or frequency-offset is. One hypothesis is also that no sequence at all was transmitted. Usually there is a detection threshold, for example a minimal correlation amplitude (e.g. relative to an estimated noise and interference level) between the received signal and a reference sequence $s_u$ in the receiver that must be exceeded in order for the receiver to declare the sequence $s_u$ as detected. The two following type of detection error events can be defined:

Miss-detection (MD) or missed detection: The receiver fails to detect a sequence that was transmitted. Optionally, the case where the receiver declares the correct sequence as detected, but still incorrectly determines a time and/or frequency offset might also count as a miss-detection.

False detection (FD) or false alarm: The receiver declares as detected a sequence that was not transmitted.

The detection performance measures miss-detection (MD) rate (or probability) and false-detection (FD) rate (or probability) could then be defined as the fraction of detections where a miss-detection or a false detection occurs. Both rates should preferably be low for good system performance.

In a given system, the level set for the detection threshold in the receiver is a trade-off between having a low MD rate and having a low FD. The lower the threshold is set, the lower will the MD rate be, and higher will the FD rate be, and vice versa.

However, a low cross-correlation can reduce the risk for FD without affecting the MD rate, and low autocorrelation can reduce the risk for MD without affecting the FD. Hence, low correlations are desirable for good performance.

In a typical radio communication system (e.g. LTE), the very first transmission from a UE after power-on is a preamble transmission on a physical random access control channel (PRACH).

The PRACH preamble is typically just a synchronization sequence, serving the purposes of informing the network about the presence of a new UE that would like to join the network, and allowing the network to estimate the round trip delay between UE and the network TRP.

The estimation is possible since the UE makes its PRACH transmission a certain predefined time interval after hearing a synchronization channel transmission transmitted by the TRP on the downlink (i.e. transmission from TRP to UE). The estimated round trip delay is then used to configure the UE with a timing advance, i.e. the UE should in any subsequent transmissions compensate for the round trip delay by transmitting early, thereby ensuring that transmissions reach the TRP at the desired point in time.

The round trip delay may sometimes be rather large, several times larger than the cyclic prefix (CP) of an OFDM symbol, or even much larger than an entire OFDM symbol. Therefore, for accurate detection with the large delay uncertainty, LTE uses for PRACH a special, very long OFDM symbol, which is based on a discrete Fourier transform (DFT) that is 12 times the size of the normal DFT, and also has a long CP. This solution may work well in LTE, but in 5G radio communication systems, where large antenna arrays might be used, the potential need for implementing a special large DFT for every antenna branch can be undesirable from an implementation point of view. There are also other potential issues, e.g. related to co-existence of different signal numerologies.

WO 2015/144256 and WO 2015/144208 are two example documents where a normal OFDM symbol repeated multiple times is used, without CP in between the repetitions. With this format, each OFDM symbol effectively serves as a long CP to the next OFDM symbol.

The NR PRACH sequences should have good autocorrelation properties for accurate delay estimation. Many sequences with good cross-correlation properties are needed in a cellular system in order to simultaneously (i) ensure that UEs in different nearby cells use different sequences so that a PRACH from a UE in a different cell is not mistakenly detected by a TRP and (ii) ensure that there are many sequences allocated to each cell so that the risk of two UEs using the same sequence to contact the network at the same time is sufficiently low (if each UE randomly selects a sequence from the allocated set, as is customary in radio communication systems such as LTE). For example, as discussed above, typical well-known sequence types such as Zadoff-Chu (ZC) (and also Gold sequences) of length N are limited to approximately N different sequences with good correlation properties (and other types such as m-sequences are limited to only one or a few sequences with good correlation properties). See e.g. [P. Fan and M. Darnell, "Sequence design for communications applications", 1996] for definitions of ZC sequences, Gold sequences, and m-sequences, also known as maximum-length sequences. There are various tricks used to go beyond this limit in some specific cases, e.g. if the maximum propagation delay in an environment is known to be below $T_{delay}$, then for each original sequence, if it has good correlation properties, one can generate a set of sequences that are identical except for cyclic shifts 0, $T_{delay}$, $2T_{delay}$, $3T_{delay}$, . . . that can easily be proved to also have good correlation properties (with all shifted and original sequences). However, if the original sequence is short, no or very few different shifts may be possible in typical environments.

An attempt to solve this issue was proposed in [R1-1700034 "RACH preamble design for NR", Huawei, HiSilicon, 3GPP TSG-RAN WG1 RAN1-NR #1, Spokane, USA, Jan. 16-20, 2017], which describes a method for generating many different sequences with purported good auto- and cross-correlation properties. This was achieved by multiplying (non-shifted) ZC sequences elementwise with different cyclic-shifted versions of an m-sequence. These sequences will hereinafter be denoted "ZCxM sequences". However, as will be demonstrated, these sequences have correlation properties that are quite far from those of, e.g., Zadoff-Chu sequences.

As explained above, there is a need for a set of many PRACH sequences with good correlation properties. However, the above-described NR PRACH preamble design consists of multiple repetitions of a short sequence instead of a single long one as in LTE, and hence there is a need to be able to generate large sets of short sequences with good correlation properties.

The embodiments disclosed herein particularly relate to mechanisms for generating a sequence. In order to obtain such mechanisms there is provided a controller, a method performed by the controller, a computer program product comprising code, for example in the form of a computer program, that when run on a controller, causes the controller to perform the method.

FIGS. 2 and 3 are flowcharts illustrating embodiments of methods for generating a sequence. The methods are performed by the controller. The methods are advantageously provided as computer programs 1520.

At least some of the herein disclosed embodiments are based on enabling generation of many short sequences with good correlation properties by first generating a long base sequence and then split the base sequence into multiple equal-length pieces (segments) that are then added together elementwise to form a single short sequence of length L. The number of possible sequences depends on the length of the long base sequence, while it can be shown that the resulting short sequences can have good correlation properties.

Reference is now made to FIG. 2 illustrating a method for generating a sequence as performed by the controller according to an embodiment.

S102: The controller 200 generates the sequence by one of (a) splitting a base sequence into multiple equal-size segments and adding said segments elementwise, and (b) generating several cyclically shifted long sequences, and truncating said cyclically shifted long sequences.

Embodiments relating to further details of generating a sequence as performed by the controller will now be disclosed.

Reference is now made to FIG. 3 illustrating methods for generating a sequence as performed by the controller according to further embodiments. It is assumed that step S102 is performed as described above with reference to FIG. 2 and a thus repeated description thereof is therefore omitted.

In some aspects the length of the base sequence is increased. Hence, according to an embodiment the controller 200 is configured to perform step S102a as part of generating the sequence in step S102:

S102a: The controller 200 increases length of the base sequence before the splitting of the base sequence.

There could be different ways to lengthen the base sequence. According to an embodiment the length is increased by padding the base sequence in frequency domain or by filtering the base sequence in time domain. According to an embodiment the length is increased to an integer multiple of the number of segments to split the base sequence into.

According to an embodiment the base sequence is a ZC sequence, a ZCxM sequence, or a Gold sequence. In some embodiments, in the case where the base sequence is a ZC sequence which is split into 2 segments, the resulting sequence will have essentially the same maximum (continuous-time) correlations $\theta_a$ and $\theta_c$ as a normal ZC sequences of the short length, while the number of sequences is doubled. The peak-to-average power ratio (PAPR) is also good.

In one embodiment, the resulting set of sequences is pruned by removing sequences with the worst PAPR until the number of sequences remaining is the same as could have been generated using normal ZC sequences, i.e. L−1. The resulting set of L−1 sequences then has similar correlation properties as the ZC sequences, but substantially better PAPR.

Hence, according to an embodiment the controller 200 is configured to perform step S102b as part of generating the sequence in step S102:

S102b: The controller 200 prunes the sequence before transmission based a criterion.

According to an embodiment the criterion is based on a peak-to-average power ratio (PAPR).

According to some aspects, as in the illustrative example of FIG. 1, the controller 200 is part of a radio transceiver device 250. Then, the sequence generated in step S102 could be transmitted by the controller 200 (or radio transceiver device 250). Hence, according to an embodiment step S104 is performed:

S104: The controller 200 (or radio transceiver device 250) transmits a signal comprising the generated sequence.

Hence, a method implemented in the radio transceiver device 250, could comprise a step of transmitting a sequence obtainable by the generating in step S102 as at least one of synchronization information and identification information. According to an embodiment the sequence has been generated by an entity other than comprised in the radio transceiver device 250.

According to an embodiment the sequence is transmitted as at least one of synchronization information and identification information. According to an embodiment the synchronization information relates to synchronization of transmission and/or reception of the radio transceiver device in at least one of time and frequency. According to an embodiment the identification information relates to identification of the radio transceiver device itself. According to an embodiment the identification information relates to identification of other information than identification of the radio transceiver device itself. For example, the identification information could identify a signal the radio transceiver device has received in downlink (where the identification information thus is defined by an index to the signal).

According to an embodiment the sequence is transmitted as part of a preamble transmission on a physical random access control channel, PRACH.

According to an embodiment the controller is part of a radar equipment 260. Then, the sequence generated in step S102 could be used during operation of the radar equipment. Hence, according to an embodiment step S106 is performed:

S106: The controller 200 operates the radar equipment 260 using the generated sequence.

In summary, the sequence generated in step S102 could be used for random access preambles in a wireless network or in radar equipment.

For random access preambles the sequence generated in step S102 could serve the purpose of a preamble sequence sent on NR PRACH or LTE PRACH, serve the purpose of constant amplitude zero autocorrelation (CAZAC) sequences, serve the purpose of of Zadoff-Chu sequences, serve the purpose of random access preambles, as synchronization signals (PSS, SSS; DMRS; SRS). In radar equipment the sequence generated in step S102 could serve the purpose of so-called Generalized Chirp-Like sequences.

Additional aspect and embodiments will now be disclosed.

Figure 5:
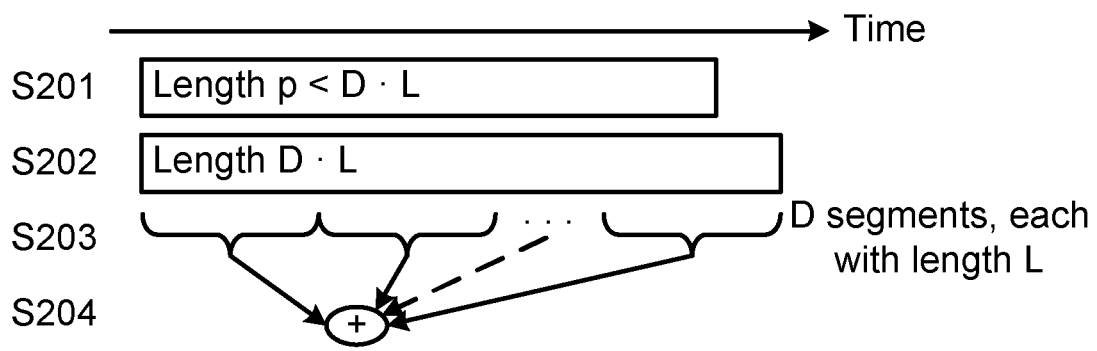
FIG. 5 schematically illustrates sequence generation according to an embodiment.

One way to generate M time-domain sequences of length L with good correlation properties will now be disclosed. These steps are illustrated in FIGS. 4 and 5. Each sequence is obtained by generating (S201) a base sequence of length $p \leq D \cdot L$, where D is an integer, then (optionally) zero-padding (S202) the sequence in frequency domain (i.e. perform DFT, zero-pad, perform IDFT) to length $D \cdot L$, splitting (S203) the resulting sequence into D segments of length L each, adding (S204) together elementwise all the segments, and finally (optionally) normalizing (S205) appropriately.

It is noted that D in principle can be any positive integer, and p can in principle be any positive integer fulfilling $p \leq D \cdot L$. The zero-padding can be at the beginning and/or the end of the (frequency-domain) sequence. If $p = D \cdot L$, the padding step can be omitted, but the method generally gives best performance when p is a prime. A prime is also the best choice for, e.g., a ZC base sequence since it allows for generation of the largest number of ZC sequences in relation to the length.

A method for generating M sequences of length L for the case of using a prime-length Zadoff-Chu sequence as base sequence will be described next. Select a prime p and an integer D so that $D \cdot L > p > M$ holds. Preferably, but not necessarily, $D \cdot L \approx p \approx M$. Generate a set of M length-p Zadoff-Chu sequences with the roots 1,2, . . . , M, and then for each sequence perform the following steps: zero-pad the sequence in frequency domain to length $D \cdot L$ (i.e. perform DFT, zero-pad to length $D \cdot L$, perform IDFT), split the resulting sequence into D segments each of length L, add together elementwise all the segments, and finally normalize the obtained sequence appropriately.

Figure 6:
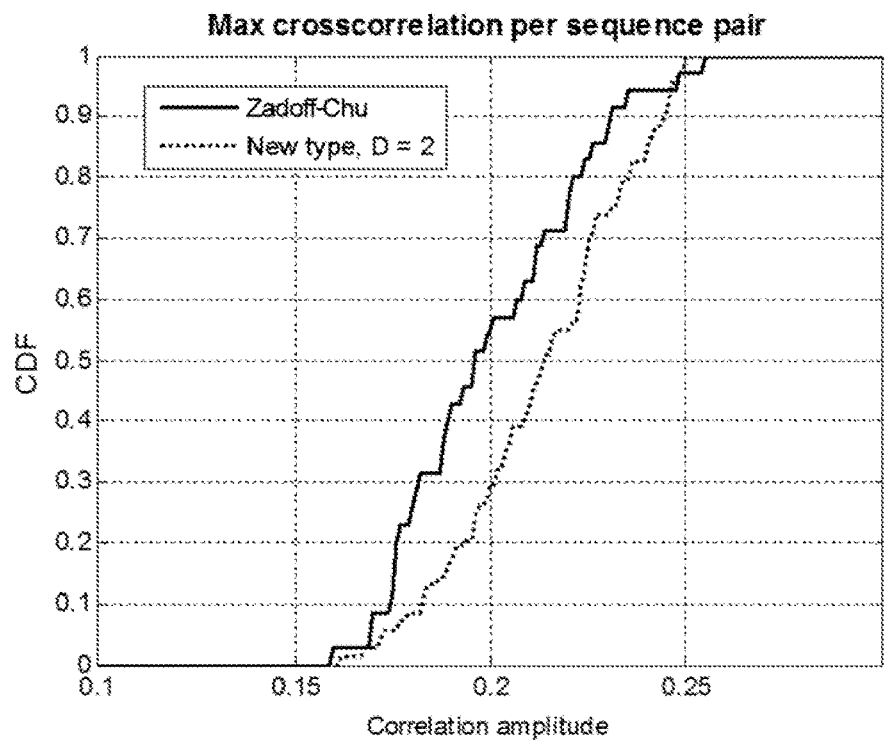
FIGS. 6, 7, 8, 9, and 10 show simulation results according to embodiments.
Figure 7:
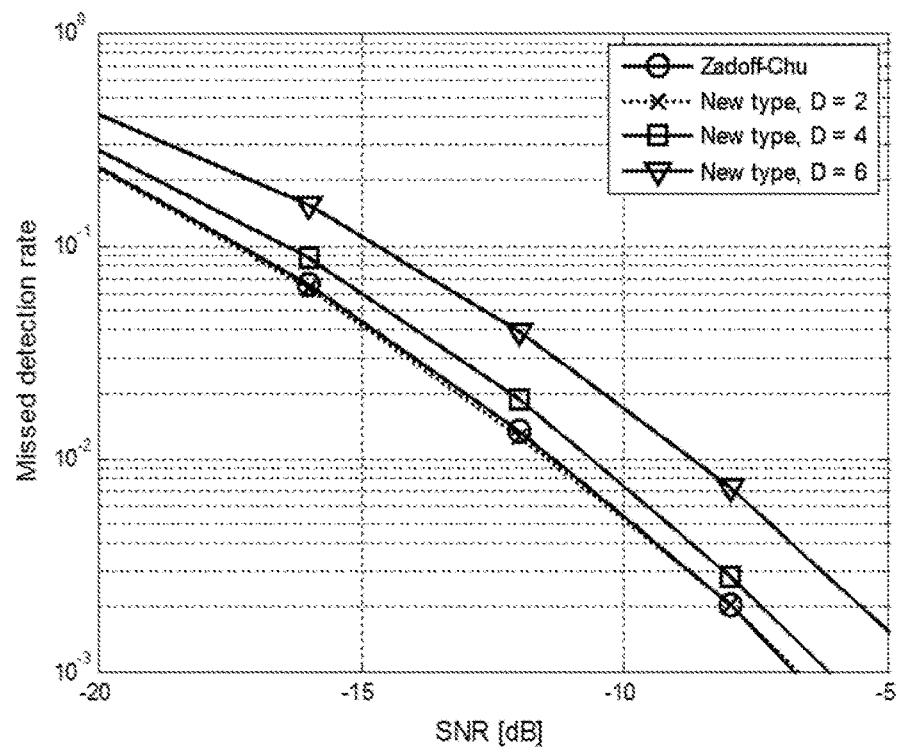
Figure 8:
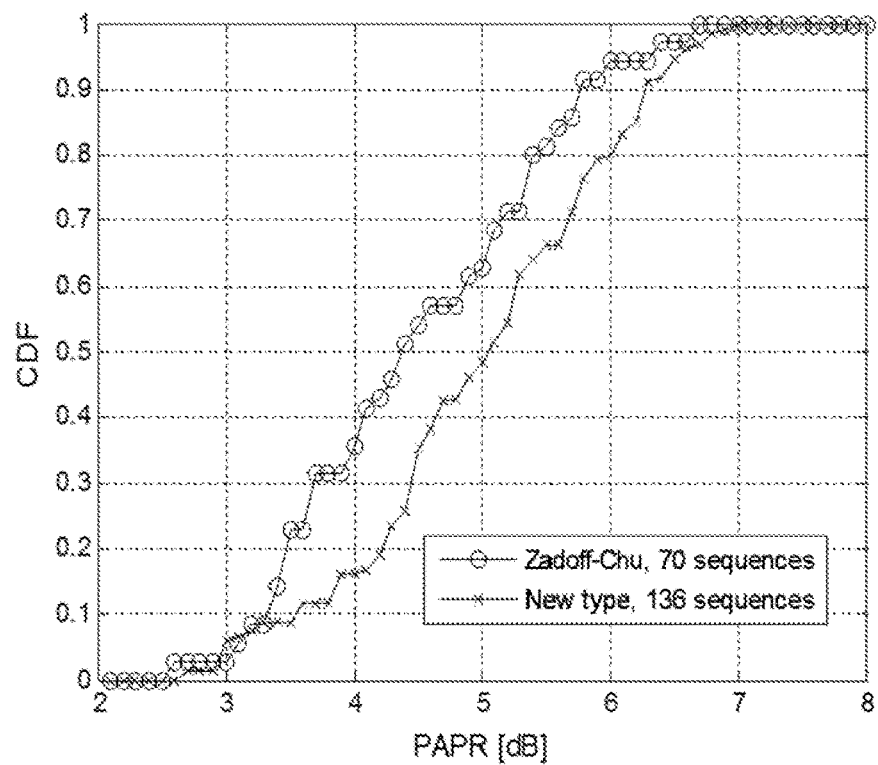

It can be shown that the resulting M sequences have essentially the same autocorrelation $\theta_a$ as ZC sequences of length L and that in the case D=2, also the maximum crosscorrelation in continuous time is almost as good as for ZC sequences of length L, see FIG. 6. In fact, the largest cross-correlation value for the herein disclosed type of sequence ($\approx 0.250$) is even somewhat lower (i.e. better) than the largest value for the know ZC sequence ($\approx 0.255$). FIG. 7 shows the detection performance where the ZC curve and the curve for D=2 coincide. Furthermore, the peak-to-average power ratio (PAPR) is also almost as good as for ZC, see FIG. 8.

As it is well known that ZC sequences (in the limit of large sequence length) are right on the theoretical bound for how many sequences that can be generated for given maximum auto- and cross-correlation properties, it may seem like a contradiction that the number of sequences can be increased with negligible increase of the maximum auto- and cross-correlation. However, the theoretical bounds apply to the (non-oversampled) discrete time sequence, and ZC in continuous time (or oversampled time) is not very close to that bound.

At least some of the herein disclosed embodiments will next be described in terms of equations. In all cases, a Zadoff-Chu base sequence is used as an example, but could be replaced by equations/code for any other type of base sequence if desirable.

A base sequence can, in the case of Zadoff-Chu sequence with root u, be generated as $$x_u(i) = e^{-j2\pi u i(i+1)/p}, 0 \leq i \leq p-1. \tag{7}$$

It is also possible to use a different type of base sequence. The length increase (stretching) can be obtained in the following way: First the DFT of the sequence is constructed as $$\tilde{x}_u(k) = \Sigma_{i=0}^{p-1} x_u(i) e^{-j2\pi i k/p}, 0 \leq k \leq p-1, \tag{8}$$

where $j = \sqrt{-1}$ is the imaginary unit. Then the padding and IDFT is obtained as $$x_u'(i) = \Sigma_{k=0}^{p-1} \tilde{x}_u(k) e^{j2\pi i k/(DL)}, 0 \leq i \leq DL-1. \tag{9}$$

Note that the zero-padding is implicitly achieved by summing only up to p−1 even though the argument in the exponential is normalized by DL.

The splitting and adding can be obtained as $$s_u(i) = \Sigma_{d=0}^{D-1} x_u'(L \cdot d + i), 0 \leq i \leq L-1. \tag{10}$$

Finally, an optional normalization can be performed, for example, as $$\hat{s}_u(i) = \frac{s_u(i)}{\sqrt{\sum_{i'=0}^{L-1} |s_u(i')|^2 / L}}, 0 \leq i \leq L-1. \tag{11}$$

The final sequence is $\hat{s}_u(i)$ or $s_u(i)$, depending on whether normalization is needed or not. By selection of the root u, it is possible to generate p−1 distinct ZC sequences $x_u$ of length p. Accordingly, the above process can be repeated to provide up to p−1 sequences $s_u(\hat{s}_u)$ with the desired correlation properties.

An alternative, but mathematically equivalent, description is to first generate a set of cyclically shifted versions of the base sequence (of length $D \cdot L$) and adding them together (without prior splitting) before finally truncating them to the right length (i.e. L). In other words, the cutting or splitting takes place after the adding step rather than before. D shifts of length $d \cdot L$ ($d = 0 \ldots D-1$) are applied and added. A translation into equations of this alternative generation method will now be provided.

A Zadoff-Chu base sequence with root u is defined by $$x_u(n) = e^{-j\frac{\pi u n(n+1)}{N_{ZC}}}, 0 \leq n \leq N_{ZC} - 1.$$

Multiple cyclically shifted versions of the base sequence can, using a revised version of the expression in clause 5.7.3 of the technical specification 3GPP TS 36.211 "Evolved Universal Terrestrial Radio Access (E-UTRA); Physical channels and modulation", Release 8 or higher, be added as $$s(t) = \beta_{PRACH} \sum_{m=0}^{M-1} \sum_{k=0}^{N_{ZC}-1} \sum_{n=0}^{N_{ZC}-1} x_u(n) \cdot e^{-j\frac{2\pi nk}{N_{ZC}}} \cdot e^{j2\pi(k/M+\varphi+Kk_0)\Delta f_{RA}(t+T_m-T_{CP})}.$$

Here, $T_m = m \cdot T_{seq}$ represents the cyclic shifts, $M = \lceil N_{ZC} \cdot \Delta f_{RA}/B \rceil$ is the number of added versions, B is the transmission bandwidth, and the other parameters are defined in clause 5.7.3 of 3GPP TS 36.211. A possible later generalization may be to use multiple roots $u_m$.

Alternatively, multiple cyclically shifted versions of the base sequence can be added as $$s(t) = \beta_{PRACH}$$
$$\sum_{d=0}^{D-1} \sum_{k=0}^{N_{ZC}-1} \sum_{n=0}^{N_{ZC}-1} x_u(n) \cdot e^{-j\frac{2\pi nk}{N_{ZC}}} \cdot e^{j2\pi(K_{RA}k+\varphi+K(k_0+1/2))\Delta f_{RA}(t+T_d-T_{CP})},$$

where t is the (continuous) time, $0 \le t < T_{SEQ} + T_{CP}$, $T_d = d \cdot T_{SEQ}$ is the cyclic shift, $K_{RA} = 1/D$, is a subcarrier spacing adjustment factor, and the other parameters are defined in clause 5.7.3 of 3GPP TS 36.211 (though different numerical values may be used).

It could be possible to set $D = \lceil N_{ZC} \cdot \Delta f_{RA}/B \rceil$, where B is the transmission bandwidth. The term ½ added to $k_0$ is optional, and can probably be removed in NR. Also, one could set $T_{CP} = 0$. A possible later generalization may be to use multiple roots $u_m$. The resulting sequences may be referred to as added cyclically shifted Zadoff-Chu sequences.

Further aspects relating to base sequences other than Zadoff-Chu will now be disclosed.

The herein disclosed embodiments for generating the sequence can in principle be applied on any other base sequence type. Not all sequence types may benefit from the herein disclosed methods, but is has been found that there are a number of different base sequence types for which the herein disclosed methods give benefits, e.g. allow increasing the number of sequences without major detection performance degradation. An example of a base sequence type where the method has been successfully applied is a Zadoff-Chu sequence with an m-sequence as a cover code [R1-1700034 "RACH preamble design for NR", Huawei, HiSilicon, 3GPP TSG-RAN WG1 RAN1-NR #1, Spokane, USA, Jan. 16-20, 2017].

Figure 9:
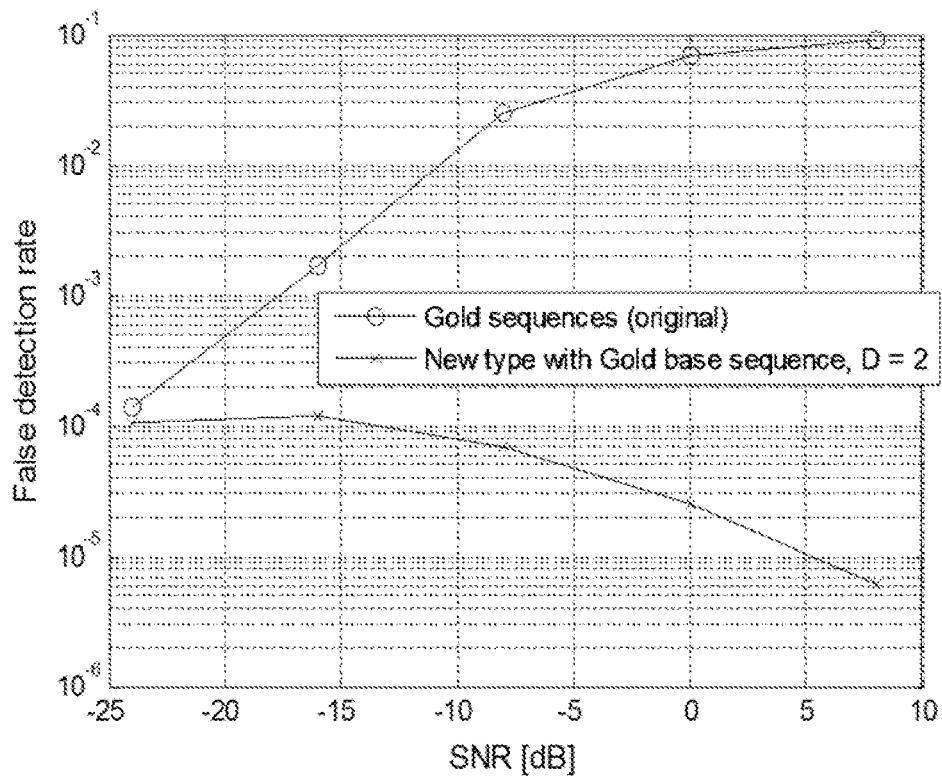

Furthermore, it has been found that for some base sequence can also improve cross-correlation properties and false-detection rate. For example, in FIG. 9 it is shown how an application of the new method using Gold sequences can dramatically decrease false-detection rate, while at the same time almost doubling the number of sequences. The original Gold sequences can be regarded as having good false-detection rates in discrete (non-oversampled) time.

Further aspects relating to sequence set pruning will now be disclosed.

Figure 10:
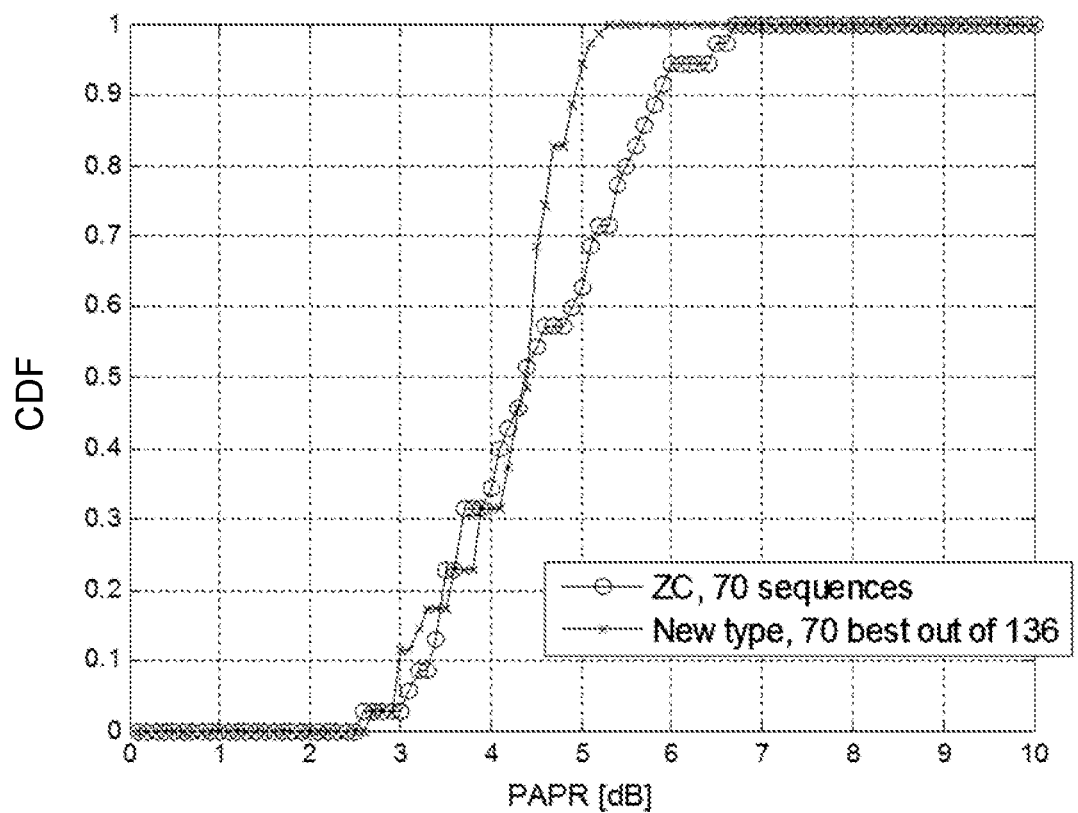

In one embodiment, the resulting set of p-1 sequences is pruned by removing the p-1-L -1 sequences with worst PAPR, so that only L-1 sequences remain, i.e. similar to the number of normal Zadoff-Chu sequences of length L that could have been generated. It then turns out that in the case where K=2 this pruned set significantly outperforms the normal Zadoff-Chu sequences in terms of PAPR, while retaining very similar performance in terms of auto- and cross-correlation, see FIG. 10.

It is possible to also prune a smaller or larger part of the sequence set. Further, instead of pruning based on PAPR, the pruning can be made based on a cubic metric.

In another embodiment, the sequence set is pruned by removing sequence with worst auto- and/or cross-correlation properties.

The sequence set can also be pruned based on a combination of PAPR, cubic metric, and/or correlation properties, i.e. a joint criterion, possibly with priority to some criterion (e.g. choosing sequences with best correlation, but in case of two sequences with equal correlation, pick the one with best PAPR).

Pruning based on other criteria is also possible.

Further aspects relating to other ways of increasing the sequence length will now be disclosed.

The increasing of the sequence length (stretching the sequence) can also be performed in other ways than by padding in the frequency domain. For example, filtering in the time domain can be used. For example, the sequence can be transformed to some other domain for padding (e.g. using a cosine transform instead of DFT).

Instead of increasing the length (stretch) of the base sequence before splitting, the base sequence could instead be padded with zeros (or having a part of the sequence repeated) in time domain to obtain a length that is divisible by D. A sequence could also be generated that is too long (DL) and where the sequence then is truncated before splitting. Splitting could be performed in segments of unequal length, where the segments are then padded and/or truncated individually before adding.

Further aspects relating to other adding methods will now be disclosed.

Another variant is to not directly add together the K sequence fragments, but rather to first time-reverse one or more of them. In one embodiment, this may be e.g. likened to "folding" the original sequence segments on top of each other, instead of "slicing and stacking" them. The adding may also use different weight factors for the different sequence segments. The sequence segments may also be subject to different non-integer cyclic shifts (e.g. by DFT, phase rotations, IDFT) before adding.

In one embodiment, the network (such as the TRP) makes available only a sequence subset whose size depends on the number of unique PRACH preambles required.

For example, if there is need only for a small set of sequences, the network may select to use a small set of sequences that have particularly good correlation properties. In particular, the network may choose to use sequences with a low value of K.

Also, even within a set of sequences with similar correlation properties, it could be advantageous to use only a subset. The reason is that the larger the number of sequences that the TRP has to search for is, i.e. the larger the number of hypotheses it has to try, the larger will the false-detection rate be for given miss-detection rate and sequence correlation properties.

In order to communicate the relevant subsets to the UEs in the network, it may be useful to have predefined sequence groups, so that the network only needs to signal (e.g. via a broadcast channel) the sequence group identities/indices.

Aspects relating to coexistence will now be disclosed.

Different sequence families generated according to the herein disclosed embodiments could be mixed to achieve improved performance/capacity trade-offs—in scenarios where a limited number of unique sequences is required, a smaller but better-performing sequence family is allocated, and if more sequences are needed, sequences from a larger sequence family (albeit with worse cross-correlation properties) are added.

It has previously been established that ZC and ZCxM sequences (above) have good inter-family cross-correlation properties, and that the ZC-based and ZCxM-based sequences of the herein disclosed embodiments have cross-correlation properties similar to their respective base sequences. In one embodiment, the initial, smaller sequence set is therefore a size-139, length-72 family generated from length-139 ZC sequences according to the herein disclosed embodiments, and the larger sequence set is a large-size (thousands), length-72 family generated from length-127 ZCxM sequences according to the herein disclosed embodiments.

Alternatively, the initial, smaller sequence set could be sequences according to the herein disclosed embodiments with base sequence ZC, p=139 (or another prime number less than 2·72), L=72, and D=2 (or some other L and D satisfying the constraints of the inventions), and the larger set found as sequences generated by the herein disclosed embodiments with ZCxM base sequences with same p, L, and D as mentioned above.

Further aspects of the embodiments disclosed herein will now be disclosed.

Although description has been provided in terms of generating sequences in the time domain, the herein disclosed embodiments are equally applicable to generate sequences in the frequency domain. The padding in frequency domain is then replaced by zero-padding in time domain (by IDFT, padding, DFT).

The steps of DFT, padding, and IDFT, can in generally be replaced by the steps IDFT, padding, DFT, with the same technical effect.

Since the resulting sequences have good autocorrelation properties, it is possible to in applications where the uncertainty in timing (lack of knowledge by the receiver about start time of received sequence) is small compared to duration of the transmitted sequence, effectively further increase the set of sequences while maintaining good correlation properties. For example, if the timing uncertainty is less than or equal to half the sequence duration, the original (length-L) sequence and the original (length-L) sequence cyclically shifted by half its length (i.e. by L/2) can be used as two different sequences. Thanks to the good autocorrelation properties of the original sequences, these two sequences will have good cross-correlation properties. The principle is similar as already used for PRACH ZC sequences in Section 5.7 of 3GPP TS 36.211, but here instead applied on the new type of sequences. The parameter D could be configurable by the network. It could for example be broadcast in a broadcast channel related to initial access, e.g. PBCH, or (possibly implicitly) signaled in PSS, SSS, or Timing Synchronization Signal. It could be signaled as a separate entity, or be part of or implied by some more general PRACH (or random access) configuration procedure.

Figure 11:
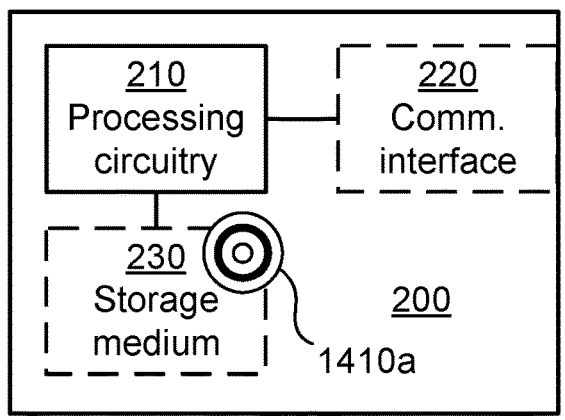
FIG. 11 is a schematic diagram showing functional units of a controller according to an embodiment.

FIG. 11 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510 (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller to perform a set of operations, or steps, S102-S106, as disclosed above. For example, the storage medium 230 may store the set of operations, and the processing circuitry 210 may be configured to retrieve the set of operations from the storage medium 230 to cause the controller to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller may further comprise a communications interface 220 at least configured for communications with other entities, nodes, and devices, such as other entities, nodes, and devices of the communications network 100. As such the communications interface 220 may comprise one or more transmitters and receivers, comprising analogue and digital components. The processing circuitry 210 controls the general operation of the controller e.g. by sending data and control signals to the communications interface 220 and the storage medium 230, by receiving data and reports from the communications interface 220, and by retrieving data and instructions from the storage medium 230. Other components, as well as the related functionality, of the controller are omitted in order not to obscure the concepts presented herein.

Figure 12:
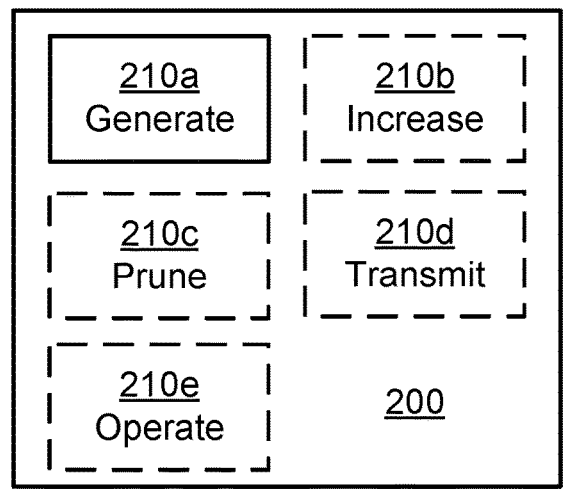
FIG. 12 is a schematic diagram showing functional modules of a controller according to an embodiment.

FIG. 12 schematically illustrates, in terms of a number of functional modules, the components of a controller 200 according to an embodiment. The controller of FIG. 12 comprises a generate module 210a configured to perform step S102. The controller of FIG. 12 may further comprise a number of optional functional modules, such as any of an increase module 210b configured to perform step S102a, a prune module 210c configured to perform step S102b, a transmit module 210d configured to perform step S104, and an operate module 210e configured to perform step S106. In general terms, each functional module 210a-210e may in one embodiment be implemented only in hardware and in another embodiment with the help of software, i.e., the latter embodiment having computer program instructions stored on the storage medium 230 which when run on the processing circuitry makes the controller perform the corresponding steps mentioned above in conjunction with FIG. 12. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

Figure 13:
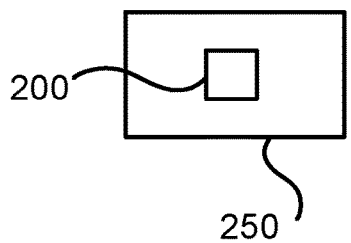
FIG. 13 is a schematic diagram showing a radio transceiver device comprising a controller according to an embodiment.
Figure 14:
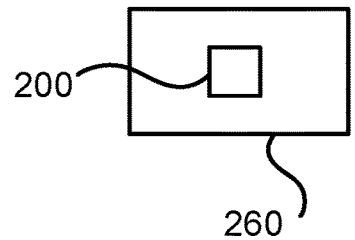
FIG. 14 is a schematic diagram showing radar equipment comprising a controller according to an embodiment.

The controller 200 may be provided as a standalone device or as a part of at least one further device. For example, as illustrated in FIG. 13 the controller 200 may be provided in, collocated with, or as part of, a radio transceiver device 250. For example, as illustrated in FIG. 14 the controller 200 may be provided in, collocated with, or as part of, a radar equipment 260.

Further, first portion of the instructions performed by the controller may be executed in a first device, and a second portion of the of the instructions performed by the controller may be executed in a second device; the herein disclosed embodiments are not limited to any particular number of devices on which the instructions performed by the controller may be executed. Hence, the methods according to the herein disclosed embodiments are suitable to be performed by a controller residing in a cloud computational environment. Therefore, although a single processing circuitry 210 is illustrated in FIG. 11 the processing circuitry 210 may be distributed among a plurality of devices, or nodes. The same applies to the functional modules 210a-210e of FIG. 12 and the computer program 1520 of FIG. 15 (see below).

Figure 15:
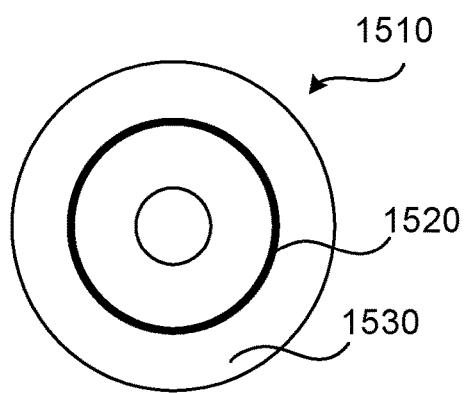
FIG. 15 shows one example of a computer program product comprising computer readable storage medium according to an embodiment.

FIG. 15 shows one example of a computer program product 1510 comprising computer readable storage medium 1530. On this computer readable storage medium 1530, a computer program 1520 can be stored, which computer program 1520 can cause the processing circuitry 210 and thereto operatively coupled entities and devices, such as the communications interface 220 and the storage medium 230, to execute methods according to embodiments described herein. The computer program 1520 and/or computer program product 1510 may thus provide means for performing any steps as herein disclosed.

In the example of FIG. 15, the computer program product 1510 is illustrated as an optical disc, such as a CD (compact disc) or a DVD (digital versatile disc) or a Blu-Ray™ disc. The computer program product 1510 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a flash memory, such as a compact flash memory. Thus, while the computer program 1520 is here schematically shown as a track on the depicted optical disk, the computer program 1520 can be stored in any way which is suitable for the computer program product 1510.

The inventive concept has mainly been described above with reference to a few embodiments. However, as is readily appreciated by a person skilled in the art, other embodiments than the ones disclosed above are equally possible within the scope of the inventive concept, as defined by the appended list of enumerated embodiments.

LIST OF ABBREVIATIONS

3GPP 3$^{rd}$ Generation Partnership Project
5G Fifth Generation
CDF Cumulative density function
DFT Discrete Fourier Transform
FD False detection (false alarm)
FFT Fast Fourier Transform
IDFT Inverse Discrete Fourier Transform
IFFT Inverse Fast Fourier Transform
LTE Long-Term Evolution
MD Miss-detection (missed detection)
MF Matched Filter
OFDM Orthogonal frequency-division multiplexing
NR New Radio
PAPR Peak-to-average power ratio
PBCH Physical Broadcast Channel
PRACH Physical random-access channel
PSS Primary Synchronization Signal
SNR Signal to Noise Ratio
SSS Secondary Synchronization Signal
TRP Transmission and Reception Point (e.g. base station, access point, etc.)
UE User Equipment
UL Uplink
ZC Zadoff-Chu (sequence)

The invention claimed is:

1. A method for generating a sequence having length L and limited maximum auto-correlation, the method comprising:
    at a controller, generating the sequence by one of:
        (a) splitting a base sequence into multiple equal-size segments of length L and adding said segments elementwise, wherein the base sequence is longer than the generated sequence, and
        (b) generating several cyclically shifted versions of a base sequence, adding the cyclically shifted versions together, and truncating said added cyclically shifted versions to have length L, wherein the base sequence is longer than the generated sequence; and
    at a radio transceiver device in a 5G radio communication system, transmitting the generated sequence as a random-access preamble or a part thereof.

2. The method of claim 1, wherein generating the sequence further comprises increasing a length of the base sequence before said splitting.

3. The method of claim 2, wherein the length is increased by padding the base sequence in frequency domain or by filtering the base sequence in time domain.

4. The method of claim 2, wherein the length is increased to an integer multiple of the number of segments to split the base sequence into.

5. The method of claim 1, wherein the base sequence is a Zadoff-Chu (ZC) sequence, a ZCxM sequence, or a Gold sequence.

6. The method of claim 1, wherein the controller is part of the radio transceiver device.

7. The method of claim 1, wherein the controller is not comprised in the radio transceiver device.

8. The method of claim 1, wherein the sequence is transmitted as part of a preamble transmission on a physical random access control channel (PRACH).

9. The method of claim 1, further comprising repeating the method at least once, to generate a set of sequences, wherein each repetition generates a sequence of length L from a distinct base sequence of length p, wherein the generated sequences have limited maximum cross-correlation if the base sequences have limited maximum cross-correlation, wherein said transmitting at the radio transceiver device comprises transmitting one of the generated sequences.

10. A method implemented in a radio transceiver device, comprising:
    receiving a sequence transmitted as or in a random-access preamble from a transmitting radio transceiver device;
    comparing the received sequence with a plurality of sequences generated by the method of claim 9; and
    on the basis of a result of the comparison, identifying the transmitting radio transceiver device.

11. The method of claim 9, further comprising pruning the set of generated sequences based on a criterion, and wherein the transmitted one of the generated sequences is a sequence remaining after pruning the set of generated sequences.

12. The method of claim 11, wherein the criterion is based on a peak-to-average power ratio (PAPR) and/or correlation properties.

13. A method implemented in a radio transceiver device, comprising:
    transmitting a sequence obtained by the method of claim 1 as at least one of synchronization information and identification information.

14. A controller for generating a sequence having length L and limited maximum auto-correlation, the controller comprising processing circuitry, the processing circuitry being configured to cause the controller to:
    generate the sequence by one of:
        (a) splitting a base sequence into multiple equal-size segments of length L and adding said segments elementwise, wherein the base sequence is longer than the generated sequence, and
        (b) generating several cyclically shifted versions of a base sequence, adding the cyclically shifted versions together, and truncating said added cyclically shifted long versions to have length L, wherein the base sequence is longer than the generated sequence; and
    make the generated sequence available to a radio transceiver device in a 5G radio communication system for transmission as a random-access preamble or part thereof.

15. A non-transitory computer-readable medium comprising, stored thereupon, a computer program for generating a sequence having length L and limited maximum auto-correlation, the computer program comprising computer code which, when run on processing circuitry of a controller, causes the controller to:
    generate the sequence by one of:
        (a) splitting a base sequence into multiple equal-size segments of length L and adding said segments elementwise, wherein the base sequence is longer than the generated sequence, and
        (b) generating several cyclically shifted versions of a base sequence, adding the cyclically shifted versions together, and truncating said added cyclically shifted versions to have length L, wherein the base sequence is longer than the generated sequence; and
    make the generated sequence available to a radio transceiver device in a 5G radio communication system for transmission as a random-access preamble or part thereof.

* * * * *